United States Patent
Haberl et al.

(10) Patent No.: US 12,157,358 B2
(45) Date of Patent: Dec. 3, 2024

(54) STORAGE CELL UNIT FOR A MOTOR VEHICLE COMPRISING AN ELECTRIC DRIVE

(71) Applicant: Bayerische Motoren Werke Aktiengesellschaft, Munich (DE)

(72) Inventors: Simon Haberl, Deisenhofen (DE); Christian Paul, Bad Aibling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 955 days.

(21) Appl. No.: 17/048,792

(22) PCT Filed: Apr. 11, 2019

(86) PCT No.: PCT/EP2019/059328
§ 371 (c)(1),
(2) Date: Oct. 19, 2020

(87) PCT Pub. No.: WO2019/201751
PCT Pub. Date: Oct. 24, 2019

(65) Prior Publication Data
US 2021/0146766 A1   May 20, 2021

(30) Foreign Application Priority Data
Apr. 20, 2018  (DE) .................. 10 2018 206 100.9

(51) Int. Cl.
*B60K 1/04*      (2019.01)
*B60L 50/64*    (2019.01)
(Continued)

(52) U.S. Cl.
CPC ............. *B60K 1/04* (2013.01); *B60L 50/64* (2019.02); *B62D 29/008* (2013.01);
(Continued)

(58) Field of Classification Search
CPC ..................... B60K 1/04; B60K 2001/0438
See application file for complete search history.

(56) References Cited

U.S. PATENT DOCUMENTS

| | | |
|---|---|---|
| 5,397,115 A | 3/1995 | Vlahovic |
| 9,751,568 B2 | 9/2017 | Bach et al. |

(Continued)

FOREIGN PATENT DOCUMENTS

| | | |
|---|---|---|
| CN | 103975457 A | 8/2014 |
| CN | 105144425 A | 12/2015 |

(Continued)

OTHER PUBLICATIONS

International Search Report (PCT/ISA/210) issued in PCT Application No. PCT/EP2019/059328 dated May 27, 2019 with English translation (four (4) pages).

(Continued)

*Primary Examiner* — Brian L Swenson
(74) *Attorney, Agent, or Firm* — Crowell & Moring LLP

(57) ABSTRACT

The invention relates to a storage cell unit which has a housing and at least one longitudinal support which forms a lateral wall of the housing or is arranged adjacently to the lateral wall of the housing. The longitudinal support is designed as a hollow support which has at least one hollow chamber that extends in the longitudinal direction of the longitudinal support and has a closed cross-section. The hollow chamber is equipped with a reinforcing element which extends over the majority of the length of the longitudinal support. The reinforcing element has a multichamber structure with a number of chambers adjoining one another.

14 Claims, 2 Drawing Sheets

(51) Int. Cl.
  *B62D 29/00* (2006.01)
  *H01M 50/242* (2021.01)
  *H01M 50/249* (2021.01)

(52) U.S. Cl.
  CPC ....... *H01M 50/242* (2021.01); *H01M 50/249* (2021.01); *B60K 2001/0438* (2013.01); *H01M 2220/20* (2013.01)

(56) References Cited

U.S. PATENT DOCUMENTS

| | | | |
|---|---|---|---|
| 10,293,860 B1* | 5/2019 | Cooper | B62D 25/025 |
| 2013/0270864 A1 | 10/2013 | Young et al. | |
| 2014/0287297 A1 | 9/2014 | Reitzle et al. | |
| 2016/0006008 A1 | 1/2016 | Volz | |
| 2016/0167544 A1 | 6/2016 | Barbat et al. | |
| 2016/0236713 A1* | 8/2016 | Sakaguchi | B62D 25/2036 |
| 2017/0210426 A1 | 7/2017 | Gao et al. | |
| 2017/0305248 A1 | 10/2017 | Hara et al. | |
| 2017/0305251 A1* | 10/2017 | Hara | H01M 50/262 |
| 2018/0186227 A1* | 7/2018 | Stephens | B60K 1/04 |
| 2019/0023323 A1* | 1/2019 | Uehata | B62D 25/025 |
| 2020/0227705 A1* | 7/2020 | Grace | B60L 3/0007 |
| 2020/0369324 A1* | 11/2020 | Koga | B62D 25/025 |
| 2021/0170853 A1* | 6/2021 | Schmidt | H01M 50/209 |
| 2021/0171106 A1* | 6/2021 | Kellner | B60R 16/08 |
| 2021/0179197 A1* | 6/2021 | Kim | B62D 27/023 |
| 2021/0265690 A1* | 8/2021 | Günther | H01M 50/204 |
| 2022/0258802 A1* | 8/2022 | Tsubaki | B60K 1/04 |
| 2022/0320659 A1* | 10/2022 | Munjurulimana | H01M 50/249 |

FOREIGN PATENT DOCUMENTS

| | | |
|---|---|---|
| CN | 205202706 U | 5/2016 |
| CN | 205970807 U | 2/2017 |
| CN | 206749904 U | 12/2017 |
| DE | 42 04 825 A1 | 6/1993 |
| DE | 40 09 401 C2 | 8/1993 |
| DE | 195 38 457 A1 | 4/1997 |
| DE | 10 2010 033 123 A1 | 2/2012 |
| DE | 10 2010 050 826 A1 | 5/2012 |
| DE | 10 2010 056 261 A1 | 6/2012 |
| DE | 10 2013 201 437 A1 | 7/2014 |
| DE | 10 2013 204 765 A1 | 9/2014 |
| DE | 10 2013 008 428 A1 | 12/2014 |
| DE | 10 2013 114 317 A1 | 6/2015 |
| DE | 10 2014 224 545 A1 | 6/2016 |
| DE | 10 2016 004 384 A1 | 10/2017 |
| DE | 10 2017 005 938 B3 | 12/2018 |

OTHER PUBLICATIONS

German-language Written Opinion (PCT/ISA/237) issued in PCT Application No. PCT/EP2019/059328 dated May 27, 2019 (five (5) pages).

German-language Search Report issued in German Application No. 10 2018 206 100.9 dated Mar. 1, 2019 with partial English translation (12 pages).

English translation of Chinese-language Office Action issued in Chinese Application No. 201980020611.3 dated Apr. 6, 2022 (eight (8) pages).

* cited by examiner

STORAGE CELL UNIT FOR A MOTOR VEHICLE COMPRISING AN ELECTRIC DRIVE

BACKGROUND AND SUMMARY OF THE INVENTION

The present invention relates to a storage cell unit for a motor vehicle having an electric drive, and to a motor vehicle having a storage cell unit of this type.

Known electric vehicles have a so-called traction battery which serves for storing electric energy for an electric drive of the electric motor vehicle. A traction battery of this type is constructed from battery cells which in turn are combined so as to form battery modules. The battery cells or battery modules, respectively, are accommodated in a housing which serves for protecting the battery cells and contains devices which serve for air-conditioning and controlling the battery cells. For example, a battery functional unit of this type with a housing is disposed in a floor region of a motor vehicle, between the front axle and the rear axle of the motor vehicle.

For example, a storage cell unit for storing electric energy for driving an electric motor of a motor vehicle is described in DE 10 2013 204 765 A1. The housing is connected from below to a left rocker panel and a right rocker panel. In the event of a lateral collision, collision energy is absorbed by the deformation of the respective rocker panel and of a lateral wall of the housing of the storage cell unit that is adjacent to the respective rocker panel. Deformation zones for protecting the storage cells accommodated in the housing are configured so as to be adjacent to the lateral walls of the housing.

Furthermore, DE 10 2013 008 428 A1 shows a motor vehicle having a traction battery which is disposed so as to be centric on a lower side of the motor vehicle. Between a housing of the traction battery and each rocker panel, one deformation element extends in each case across the entire length of the housing. The two deformation elements are configured as extruded profiles which have a rectangular cross section and extend in the longitudinal direction of the vehicle.

It is the object of the present invention to provide a storage cell unit for a motor vehicle having an electric drive, as well as a motor vehicle having a storage cell unit of this type, wherein the storage cell unit has a very low weight and a minor installation space associated with a high capability of absorbing collision energy.

This object is achieved by a storage cell unit which has the features of the independent claim. Preferred refinements of the invention are set forth in the dependent patent claims.

The storage cell unit according to the invention has a housing and at least one longitudinal support which configures a lateral wall of the housing or is disposed so as to be adjacent to the lateral wall of the housing. The longitudinal support is configured as a hollow section which has at least one cavity which extends in the longitudinal direction of the longitudinal support and has a closed cross section. A reinforcement element which extends across a majority of the length of the longitudinal support is disposed in the cavity. The reinforcement element has a multi-compartment structure having a multiplicity of mutually adjacent compartments.

The flexural stiffness of the longitudinal support is increased by the reinforcement element. Moreover, a force level at which the longitudinal support is deformed is thus increased. Overall, a capability of the longitudinal support for absorbing collision energy at a low weight is thus increased using simple means, on account of which the component parts in the housing are better protected in the event of a collision of the motor vehicle.

The reinforcement element is in particular configured for absorbing collision energy in the event of a collision, in particular a lateral collision, of the motor vehicle. To this end, the reinforcement element in the course of the collision in which the longitudinal support is deformed may be deformed by failing due to brittle and/or plastic properties.

The storage cell unit which has a traction battery, thus a drive battery, is configured for a motor vehicle having an electric drive. The motor vehicle is preferably a passenger motor vehicle having in particular two axles and four wheels, for example.

The longitudinal support extends in the longitudinal direction of the storage cell unit and thus preferably in a longitudinal direction, thus a main direction of travel, of the motor vehicle.

The storage cell unit is preferably a unit which is separate from a body-in-white and is able to be in particular releasably assembled on a body, or the body-in-white. The storage cell unit thus does not represent any so-called body-integral storage cell unit in which the component parts of the body form a housing of the storage cell unit. The longitudinal support thus is also preferably not a component part of a body-in-white of the motor vehicle.

The reinforcement element is preferably a part which is configured or produced, respectively, separately from the longitudinal support.

On account thereof, the reinforcement element can be produced from a material other than that of the longitudinal support, and the multi-compartment structure of the reinforcement element can be easily produced.

The reinforcement element, when viewed in a section perpendicular to the longitudinal direction of the longitudinal support, can fill the cavity of the longitudinal support in a substantially complete manner.

On account thereof, the reinforcement element can be more easily fastened without play in the cavity. Furthermore, the collision-energy absorbing effect is maximized on account thereof.

The cavity of the longitudinal support preferably has a rectangular shape.

The longitudinal support can have a profile having a plurality of cavities in which profile the reinforcement element is disposed in a single cavity or a plurality of cavities.

The housing is preferably composed of lateral walls as well as a lower wall, thus a base, and an upper wall, thus a cover.

According to one preferred refinement of the storage cell unit, the multi-compartment structure is configured from a multiplicity of mutually adjacent compartments having a triangular, in particular an equilateral triangular, cross section, and/or a quadrangular, in particular a square, cross section, and/or a hexagonal, in particular a regular hexagonal, cross section (corresponding to a honeycomb structure), and/or a circular cross section.

A wall thickness of the multi-compartment structure is preferably 1 to 4 mm, for example 1.5 mm to 2.5 mm.

According to one preferred refinement, a ratio of an area of the walls between the compartments to an area of the compartments in a cross section of the multi-compartment structure, which is transverse, in particular substantially perpendicular, to the compartments is in a range from 0.002 to 0.05.

Furthermore, the longitudinal support is preferably configured for fastening to a lower side of the motor vehicle, in particularly to a rocker panel of the motor vehicle.

According to one preferred refinement, the longitudinal support is an extruded profile which is in particular configured from a light metal, for example from aluminum or an aluminum alloy.

The compartments of the reinforcement element preferably extend parallel to a longitudinal direction of the longitudinal support. The compartments herein can in particular extend across an entire length of the reinforcement element. The longitudinal direction is, for example, a direction parallel to the x-direction in the vehicle coordinate system.

Alternatively, the compartments of the reinforcement element can extend parallel to a transverse direction, in particular a direction substantially perpendicular to the longitudinal direction, of the longitudinal support. The compartments herein can extend across an entire width of the reinforcement element. The transverse direction is, for example, a direction parallel to the y-direction in the vehicle coordinate system.

The reinforcement element can advantageously be produced by means of an injection-molding method or a pultrusion method.

Furthermore advantageously, the reinforcement element is configured from a plastics material, for example a fiber-reinforced plastics material. The plastics material can be a thermosetting plastics material or a thermoplastic plastics material.

In the case of a fiber-reinforced plastics material, the fibers can be glass fibers, basalt fibers, ceramic fibers, carbon fibers, polyester fibers, nylon fibers, polyethylene fibers, aramid fibers, or else natural fibers.

The fibers can preferably be short fibers or long fibers.

According to one preferred refinement, the reinforcement element is composed of a plurality of reinforcement element segments, in particular in the longitudinal direction of the reinforcement element segment. The reinforcement element segments can be connected to one another in a form-fitting manner by means of corresponding connection installations. For example, the reinforcement element segments can be connected to one another by way of a dovetail connection. The connection installations, for example a dovetail-shaped protrusion and a dovetail-shaped groove or receptacle, respectively, can be integrally molded on the reinforcement element segments, in particular on end portions of the reinforcement element segments.

On account thereof, a sufficiently long reinforcement element can be configured independently of a production method of the reinforcement element. The connection between the reinforcement element segments facilitates the reinforcement element being incorporated in the cavity and optionally suppresses any relative movement between the reinforcement element segments.

According to one further preferred refinement, the reinforcement element has integral clamping installations for connecting the reinforcement element in a force-fitting manner to the longitudinal support. A clamping installation of this type can be an elastically deformable protrusion, in particular a spring element, which is elastically preloaded once the reinforcement element has been incorporated in the cavity and jams the reinforcement element in the cavity. The clamping installation can be integrally molded on the reinforcement element.

On account thereof, the reinforcement element can be fixed in the cavity of the longitudinal support by simple means. Any movement of the reinforcement element in the cavity is suppressed on account thereof.

In the case of the longitudinal support being disposed so as to be adjacent to the lateral wall of the housing, the longitudinal support is preferably connected to the lateral wall of the housing. The longitudinal support is in particular an integral component part of the storage cell unit.

The invention furthermore relates to a motor vehicle having an electric drive having a storage cell unit as described above. The storage cell unit is assembled on the lower side of the motor vehicle, between a front axle and a rear axle of the motor vehicle, and the longitudinal support extends parallel to a longitudinal direction of the motor vehicle.

The storage cell unit preferably has a left longitudinal support and a right longitudinal support. The left longitudinal support is preferably assigned to a left rocker panel, and the right longitudinal support is preferably assigned to a right rocker panel. The left longitudinal support is advantageously fastened to the left rocker panel, while the right longitudinal support is advantageously fastened to the right rocker panel. The longitudinal supports can be configured in such a manner that the former reinforce the assigned rocker panel of the motor vehicle.

The entire storage cell unit by way of the lateral longitudinal supports thereof can thus be fastened to the motor vehicle.

Refinements of the invention set forth above can be combined with one another in an arbitrary manner to the extent that this is possible and expedient.

A brief description of the drawings follows hereunder.

DETAILED DESCRIPTION OF THE DRAWINGS

A detailed description of the exemplary embodiments of the present invention with reference to FIGS. 1 to 6 follows hereunder.

Figure 1:
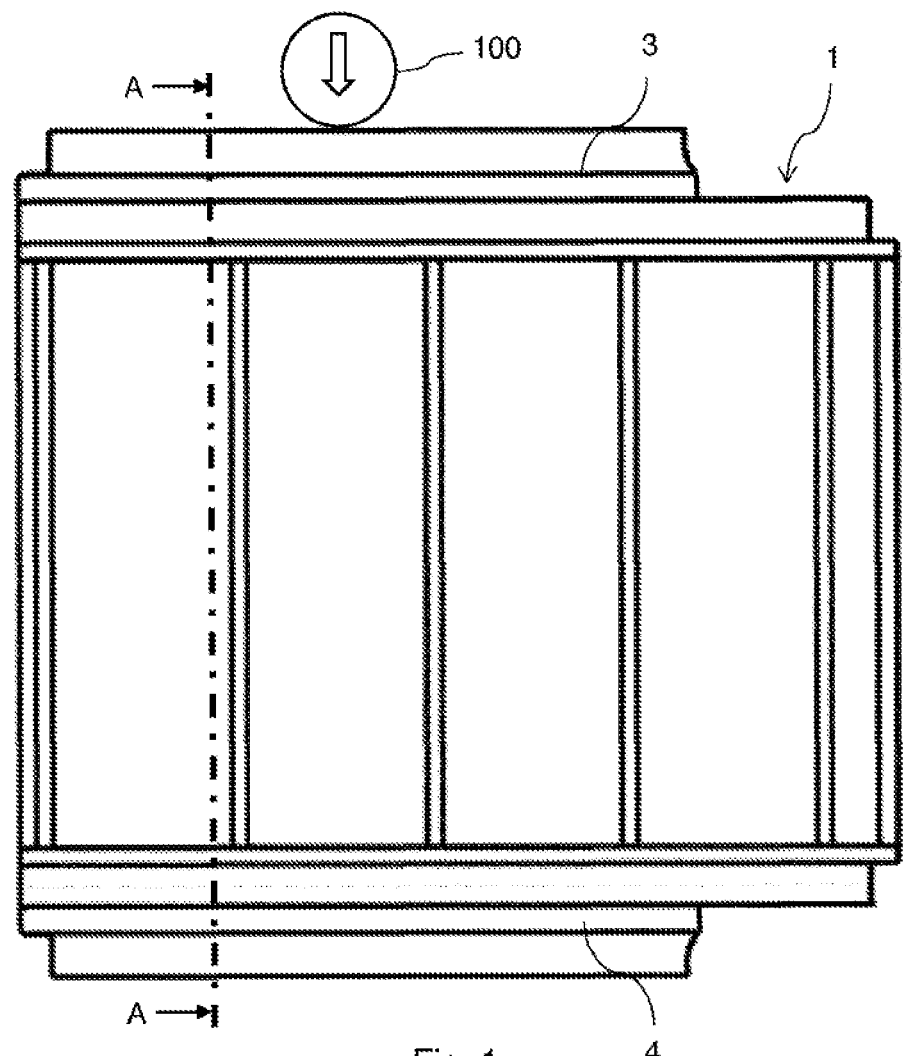
FIG. 1 is a schematic plan view of a storage cell unit according to a first exemplary embodiment of the present invention.
Figure 2:
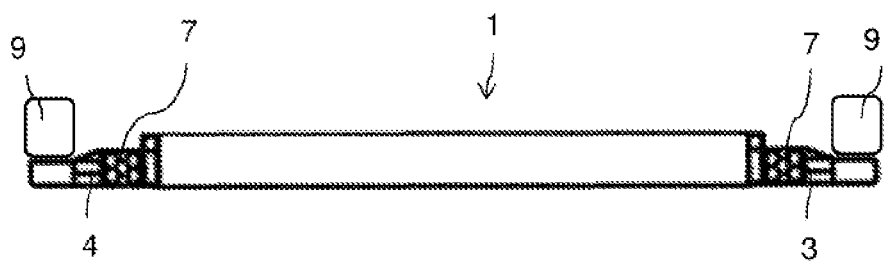
FIG. 2 is a schematic sectional view of the storage cell unit approximately along a line A-A in FIG. 1, that is to say along a vehicle transverse direction and a vehicle vertical direction, according to the first exemplary embodiment of the present invention.

A storage cell unit for a motor vehicle having at least one electric drive according to a first exemplary embodiment is schematically shown in FIGS. 1 and 2. The storage cell unit forms a traction battery, that is to say a drive battery, of the motor vehicle having the electric drive. The storage cell unit has a housing 1 having a right longitudinal support 3 and a left longitudinal support 4. Transverse supports run so as to be mutually spaced apart between the right longitudinal support 3 and the left longitudinal support 4. The right longitudinal support 3 and the left longitudinal support 4 form lateral walls of the housing 1. The housing 1 serves for receiving and protecting battery cells or battery modules composed of battery cells, respectively, as well as control installations, cooling installations, and electrical wiring, and conjointly with these component parts forms the storage cell unit. The housing 1 for the protection of these component parts is embodied so as to be substantially tight in relation to gases and liquids. The storage cell unit is disposed in the floor region of the motor vehicle, between a front axle and a rear axle of the motor vehicle. The battery modules (not shown) are disposed between the transverse supports of the housing.

Figure 3:
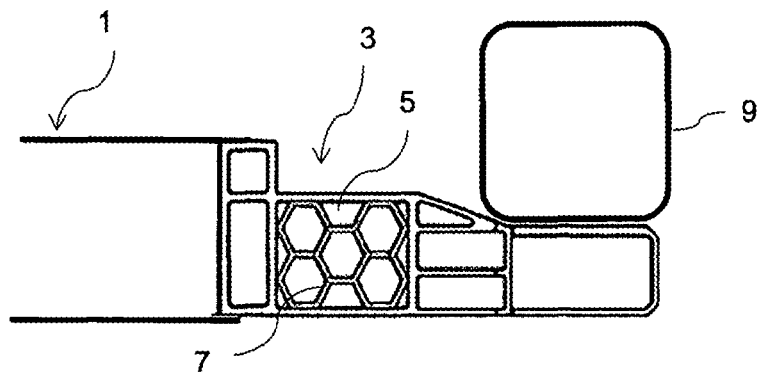
FIG. 3 is a schematic sectional view of a detail of the storage cell unit according to the first exemplary embodiment of the present invention.

The longitudinal supports 3, 4 are configured for assembly on a lower side of the rocker panels 9 of the body of the motor vehicle, as is also shown in FIG. 3. The storage cell unit forms a functional group which is able to be assembled from below on the body of the motor vehicle. The longitudinal supports 3, 4 herein complement the rocker panels 9 in terms of the function of the latter as structural supports of the body as well as a load path in the event of a lateral collision of the motor vehicle. The longitudinal supports 3, 4, like the rocker panels 9, serve for absorbing collision energy by deformation.

Figure 4:
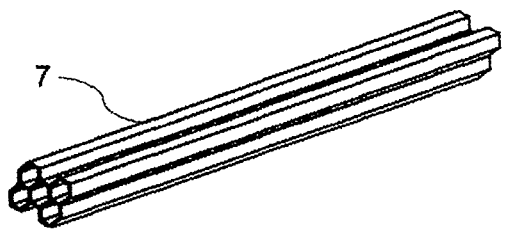
FIG. 4 is a schematic perspective view of a reinforcement element according to the first exemplary embodiment of the present invention.

The housing 1 according to the first exemplary embodiment is made from aluminum, or an aluminum alloy, respectively. The longitudinal supports 3, 4 as hollow profiles herein are configured via an extrusion method. Each longitudinal support 3, 4 has a plurality of cavities, as can be better seen in the sectional view of FIG. 3. A reinforcement element 7 which is shown in a perspective view in FIG. 4 is received in a cavity 5. The reinforcement element 7 has a multi-compartment structure composed of a multiplicity of hollow compartments having a regular hexagonal cross section. In other words, the multi-compartment structure has a honeycomb construction. In the present first exemplary embodiment, the reinforcement element 7 is composed of five corresponding honeycombs but may be composed of another number of honeycombs. The honeycombs extend across an entire length of the reinforcement element 7. The reinforcement element 7 extends across almost the entire length of the cavity of the longitudinal support 3, 4. The hollow compartments of the reinforcement element 7 extend in the longitudinal direction of the reinforcement element 7, or of the longitudinal support 3, 4, that is to say in the x-direction of the motor vehicle. The reinforcement element 7 is produced from a plastics material in a pultrusion method. The plastics material optionally contains reinforcing fibers, in particular short fibers, for example glass fibers or carbon fibers. The plastics material can be a thermosetting or thermoplastic plastics material. The reinforcement element 7 in the cross section fills almost the entire cavity of the longitudinal support 3, 4. The reinforcement element 7 is inserted into the longitudinal supports 3, 4 and therein fixed using suitable means.

A wall thickness of the honeycombs is between 1 mm and 4 mm, preferably 2 mm. A ratio of the wall area to the hollow compartment area in a section along the vehicle vertical direction and the vehicle transverse direction, that is to say a cross section in the y-direction and z-direction in the vehicle coordinate system, is preferably 0.002 mm to 0.05 mm, for example 0.0032 mm.

Functioning of the storage cell unit in the event of a lateral collision of the motor vehicle and a collision obstacle is explained hereunder. A collision obstacle 100 in the form of a post, which impacts the body on one side of the motor vehicle, is shown in an exemplary manner in FIG. 1. The direction of the collision is illustrated by an arrow. The collision obstacle 100 thus impacts the longitudinal support 3, 4 as well as the rocker panel 9 lying thereabove. The collision load herein is introduced inter alia into the longitudinal support 3, 4, wherein the longitudinal support 3, 4 is supported on the transverse supports of the housing 1. The longitudinal support fails once a predefined load level has been exceeded, and is deformed in a substantially plastic manner. The reinforcement element 7 which is located in one of the cavities of the longitudinal support 3, 4 is likewise deformed on account thereof. In order for the housing 1 to be protected, further collision energy is absorbed by the deformation of the reinforcement element 7 which fails due to brittle or plastic properties. On account thereof, a predefined quantity of collision energy can be absorbed without the region of the housing 1, in which the aforementioned battery cells are located, being deformed. The component parts within the housing 1 are thus protected against damage in the collision.

On account of the reinforcement element 7, the storage cell unit can be embodied so as to be sufficiently light while having an adequate capability for absorbing collision energy.

Figure 5:
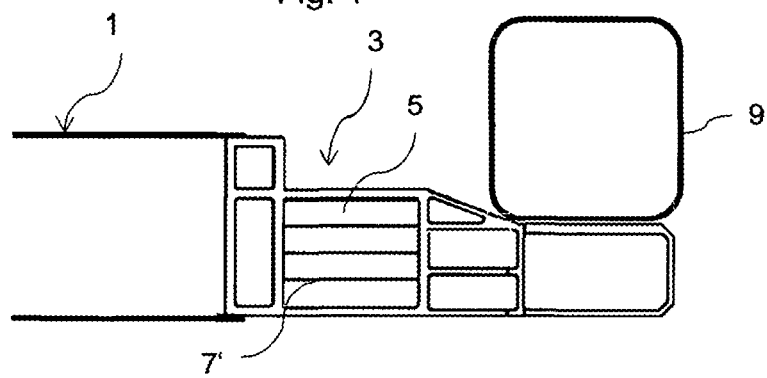
FIG. 5 is a schematic sectional view of a detail of a storage cell unit according to a second exemplary embodiment of the present invention.
Figure 6:
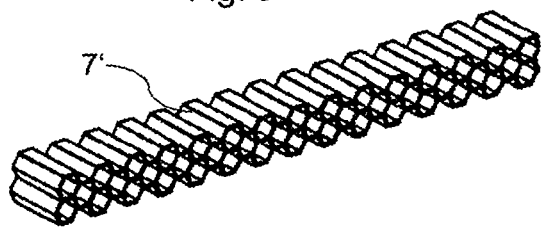
FIG. 6 is a schematic perspective view of reinforcement element according to the second exemplary embodiment of the present invention.

A second exemplary embodiment of the present invention is explained with reference to FIGS. 5 and 6. With the exception of the reinforcement element 7', a storage cell unit according to the second exemplary embodiment is constructed so as to be identical to the storage cell unit according to the first exemplary embodiment. In order to avoid any redundant description, only the points of differentiation between the second exemplary embodiment and the first exemplary embodiment will thus be discussed hereunder. As is shown in FIG. 6, the reinforcement element 7' according to the second exemplary embodiment is composed of a multi-compartment structure having a multiplicity of hollow compartments having a regular hexagonal cross section. The multi-compartment structure of the second exemplary embodiment thus also has a honeycomb-shaped construction. In contrast to the first exemplary embodiment, the honeycombs of the reinforcement element 7' of the second exemplary embodiment extend in the vehicle transverse direction, thus in the y-direction according to the known vehicle coordinate system. The honeycombs thus extend transversely or perpendicularly, respectively, to the longitudinal direction of the longitudinal support 3, 4 or of a cavity 5 of the longitudinal support 3, 4, respectively. In a manner corresponding to the first exemplary embodiment, the reinforcement element 7' extends across almost the entire length of the cavity of the longitudinal support 3, 4. The reinforcement element 7' is produced from plastics material in an injection-molding method. The reinforcement element 7' herein can be composed of a plurality of segments which are joined together so as to correspond to the length of the cavity of the longitudinal support 3, 4. To this end, a connection installation for connecting the individual segments in a form-fitting manner is integrally molded on the segments. The connection installation is composed, for example, of a dovetail-shaped protrusion at one end of the reinforcement element segment and a correspondingly shaped dovetail-shaped groove at the other end of the reinforcement element segment. Accordingly, a desired number of reinforcement element segments can be reliably fastened to one another so as to correspond to a desired length of the reinforcement element. The reinforcement element 7' according to the second exemplary embodiment additionally has a clamping element molded thereon which enables the reinforcement element 7' to be reliably positioned in the cavity 5 of the longitudinal support. The clamping element can be an elastically deformable tab which, when the reinforcement element 7' is introduced into the cavity 5, is elastically deformed and presses against the wall of the cavity 5, thus fixing the reinforcement element 7' in a force-fitting and friction-fitting manner in the cavity 5.

What is claimed is:

1. A storage cell unit for a motor vehicle having an electric drive, comprising:
   a housing;
   a longitudinal support which: i) is disposed outside of the housing, and ii) defines a lateral wall of the housing, wherein
      the longitudinal support is configured as a hollow section which has at least one cavity which extends in the longitudinal direction of the longitudinal support and has a closed cross section; and
   a reinforcement element disposed in the cavity, which reinforcement element extends over a majority of a length of the longitudinal support and has a multi-compartment structure having a plurality of mutually adjacent compartments, wherein
      the reinforcement element is configured to absorb collision energy in an event of a collision of the motor vehicle.

2. The storage cell unit according to claim 1, wherein the multi-compartment structure is configured from a plurality of mutually adjacent compartments, each compartment having one of: a triangular cross section, a quadrangular cross section, a hexagonal cross section, or a circular cross section.

3. The storage cell unit according to claim 1, wherein a ratio of an area of the walls between the compartments to an area of the compartments in a cross section of the multi-compartment structure, which is transverse to the compartments is in a range from 0.002 to 0.05.

4. The storage cell unit according to claim 1, wherein the longitudinal support is configured for fastening to a lower side of the motor vehicle.

5. The storage cell unit according to claim 1, wherein the longitudinal support is configured for fastening to a rocker panel of the motor vehicle.

6. The storage cell unit according to claim 1, wherein the longitudinal support is an extruded profile.

7. The storage cell unit according to claim 6, wherein the extruded profile is made of aluminum or an aluminum alloy.

8. The storage cell unit according to claim 1, wherein the compartments of the reinforcement element extend parallel to a longitudinal direction of the cavity.

9. The storage cell unit according to claim 1, wherein the compartments of the reinforcement element extend parallel to a transverse direction of the cavity.

10. The storage cell unit according to claim 1, wherein the reinforcement element is an injection-molding reinforcement element or a pultrusion formed reinforcement element.

11. The storage cell unit according to claim 1, wherein the reinforcement element is composed of a plurality of reinforcement element segments which are connected to one another in a form-fitting manner.

12. The storage cell unit according to claim 1, wherein the reinforcement element has integral clamping installations for fastening the reinforcement element in a force-fitting and/or friction-fitting manner in the cavity of the longitudinal support.

13. The storage cell unit according to claim 1, wherein the longitudinal support is disposed so as to be adjacent to the lateral wall of the housing and is connected to the lateral wall of the housing, and
the longitudinal support is an integral component part of the storage cell unit.

14. A motor vehicle having an electric drive, comprising:
a storage cell unit according to claim 1, wherein
the storage cell unit is assembled on a lower side of the motor vehicle, between a front axle and a rear axle of the motor vehicle, and the longitudinal support extends parallel to a longitudinal direction of the motor vehicle.

* * * * *